United States Patent [19]

Mikosz et al.

[11] 4,224,722
[45] Sep. 30, 1980

[54] SWIVEL HOOK ASSEMBLY

[75] Inventors: Daniel S. Mikosz, Arlington Heights; Alfred J. LeMert, Prospect Heights, both of Ill.

[73] Assignee: Ludwig Industries, Chicago, Ill.

[21] Appl. No.: 933,471

[22] Filed: Aug. 14, 1978

[51] Int. Cl.² .............................................. A44B 13/02
[52] U.S. Cl. .................................... 24/234; 24/265 H
[58] Field of Search ...................... 24/234, 233, 232 R, 24/265 H; 403/57, 165

[56] References Cited

U.S. PATENT DOCUMENTS

| | | | |
|---|---|---|---|
| 2,166,666 | 7/1939 | Rolan | 24/234 |
| 2,490,931 | 12/1949 | Thompson | 24/234 UX |
| 3,501,817 | 3/1970 | Bambener et al. | 24/233 |

*Primary Examiner*—Philip C. Kannan
*Attorney, Agent, or Firm*—W. Melville Van Sciver

[57] ABSTRACT

A swivel hook assembly for use primarily for attaching musical instruments, such as a drum or a pair of drums or other percussion instruments, to the torso of a person, so that the person has both hands free to grasp drumsticks or mallets to play the instruments, particularly when marching. The entire assembly is preferably formed from stamped metal parts and is provided with a slot forming member through which a carrying strap or harness may pass, which slot forming member is provided with a pair of openings at its extremities for the reception of hooks usually attached to straps surrounding the torso of the person playing the instruments. A strap extending across at least one of the shoulders of the person passes or is looped through the slot to properly position the assembly.

2 Claims, 4 Drawing Figures

U.S. Patent Sep. 30, 1980 4,224,722
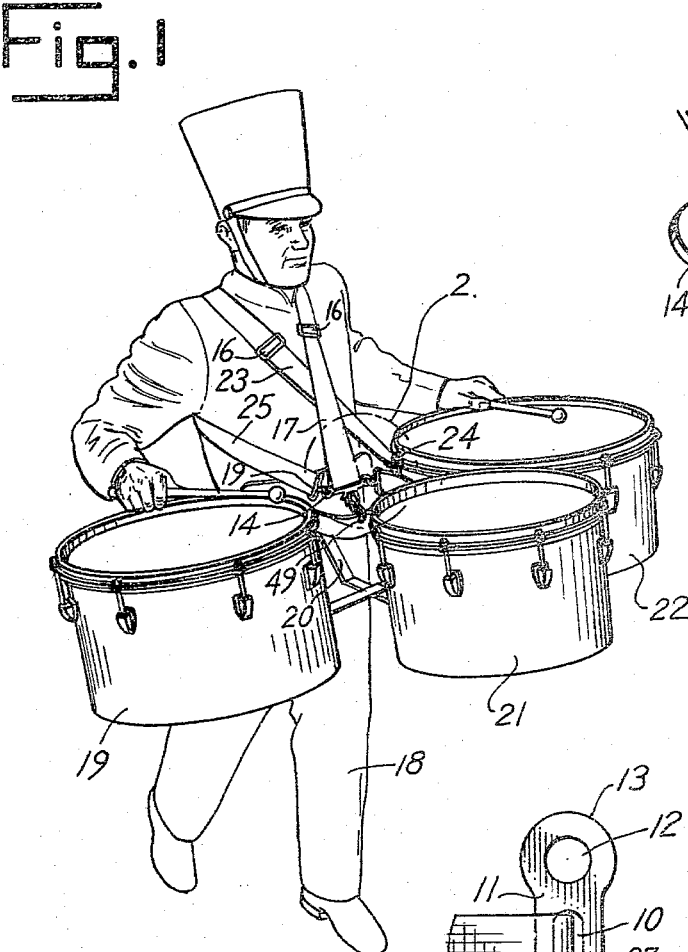
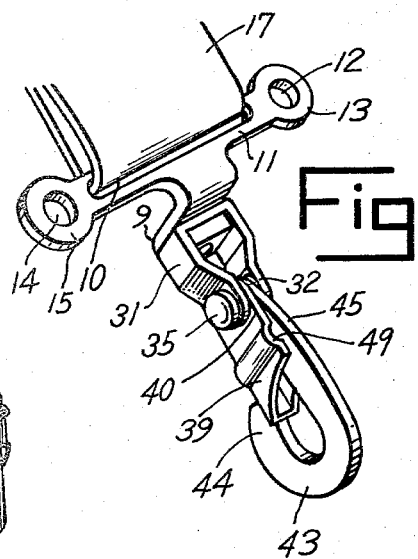
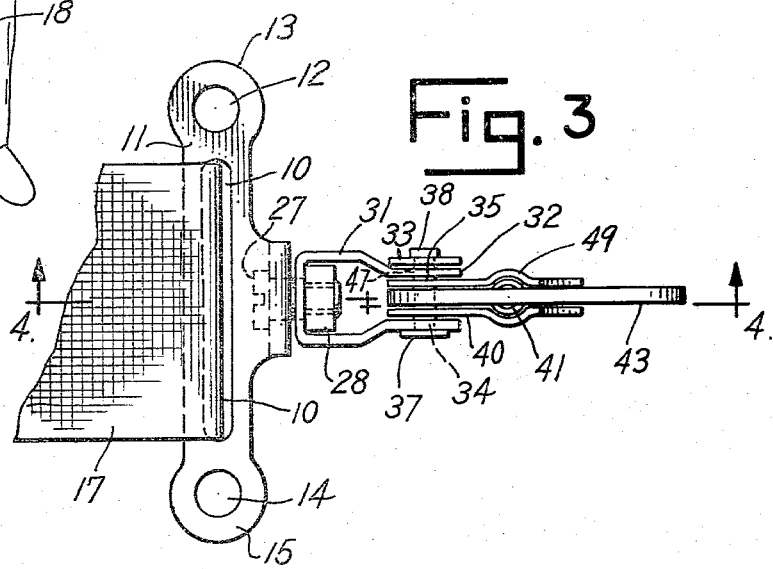
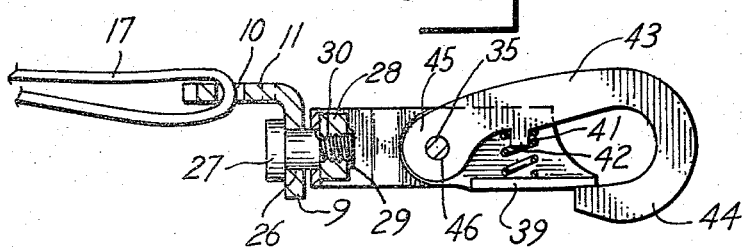

SWIVEL HOOK ASSEMBLY

FIELD OF THE INVENTION

The invention relates to a swivel hook assembly for percussion musical instruments which are carried by a person, when, for example, the person is a part of a marching band.

BACKGROUND OF THE INVENTION

Heretofore, swivel hook assemblies have been utilized for the purposes set forth herein, but such assemblies have been formed mainly of castings, which are heavy, expensive and lacking in aesthetic appeal and lacked the feature of having provisions for attaching more than one strap thereto. The present invention overcomes the deficiencies of the prior cast swivel hook assemblies.

SUMMARY OF THE INVENTION

This invention provides a swivel hook for drums, or other instruments, used, for example, by the players of instruments in a marching band. A swivel hook assembly is provided for securing the assembly to the torso of a person carrying such instrument and the swivel hook assembly is so formed to provide for securing both ends of a strap to the torso of the person and a detachable hook to the drum, or other instrument, or carrying member for such instruments.

BRIEF DESCRIPTION OF THE DRAWING

FIG. 1 shows an individual in a marching band carrying three drums which are secured to a supporting member, which is, in turn, secured to the torso of the person by the swivel hook assembly of this invention which engages the straps going over the one shoulder of the person and also the strap surrounding the body of the person beneath the arms;

FIG. 2 is a perspective view of the swivel hook assembly shown in the circle in FIG. 1 and includes the loop on one of the straps going across the shoulder of the person carrying the drums;

FIG. 3 is a top plan view of the swivel hook assembly shown in FIG. 2; and

FIG. 4 is a sectional view of the swivel hook assembly taken on line 4—4 of FIG. 3.

DESCRIPTION OF THE PREFERRED EMBODIMENT

The swivel hook assembly comprises a stamping 11 having an elongated slot 10 formed therein. The stamping is provided with ears 13 and 15 at the ends thereof in which holes 12 and 14 respectively are formed. A strap 17 which is generally formed of webbing extends across one shoulder of a person shown by the numeral 18 who is carrying the drums, which person may be a musician forming part of a marching band. The strap 17 is adjustable by wellknown adjusting devices 16. A second strap 23 also extends over the other shoulder of the person 18. Strap 17 is passed through the slot 10 and the stamping 11 so that the swivel hook assembly is positioned properly relative to the body of the player and the instruments which are to be carried. Strap 23, extending over the other shoulder of the person, is provided with a hook (not shown) which engages a member 24 secured to drum 22. The person marching in the band is shown as carrying three drums, namely drums 19, 21 and 22.

The stamping 11 is also provided with a downwardly extending flange 9 having an opening 26 formed therein. A U-shaped stamping 31 having an opening 30 formed therein is rotatably secured to the flange 25 by a bolt 27 and a nut 28. The bolt is provided with a turned-over portion shown at 29 to prevent the nut 28 from being inadvertantly removed from the bolt 27 once the nut is placed thereon. The bolt 27 provides a pivotal connection for the member 31 and those parts attached thereto.

The member 31 is provided with opposed extensions 32 having aligned openings 34 therein, through which extends a pivot pin 35 provided with a head 37 at one end and a turned-over end 38 at the opposite end. A washer 33 is positioned between the outer surface of one of the flanges 32 and is held in position by the turned-over portion 38 of the pivot pin 35.

A channel shaped stamping 39 is provided with flanges 40 which have opposite openings 47 therein through which the pivot pin 35 also extends. The member, or stamping, 39 is provided with semicircular deformations 49 therein for the retention of a coiled spring 41 which is positioned between a hook 43 and the bottom of the member 39. The hook 43 is provided with a rounded hooked end 44 which engages the member 39 and is biased toward the member 39 by the spring 41. When it is desired to fasten the hook to the desired ring, or the like, the member 39 may be depressed by the finger of the person using the assembly and after the desired element is snapped into place, the hook is closed by the member 39 being forced into engagement with the portion 44 of the hook member 43. As best shown in FIG. 4, the hook member 43 is provided with a portion 45 through which a hole, or aperture, 46 is formed for the passage of the pivot pin 35 so that the entire hook portion 43 is pivotally mounted for rotation about the pivot pin 35. The hook member 43 is therefore journalled about the pivot pin 35 which, as stated, is retained in the stamping 31 in a manner heretofore described.

When it is desired to use the attachment, the person playing the instruments first secures, for example, the drums 19, 21 and 22 shown in FIG. 1 to a semicircular carrying member 20 which is usually formed of metal with apertures spaced around the carrying member 20. One strap 17 which goes over one of the shoulders of the carrier passes through the slot 10 in the stamping 12 as heretofore explained and the assembly is positioned by adjustment of the strap by the adjusting means 16. Another strap 23 which goes across the other shoulder of the person is secured at 24 to drum 22. The drums 19 and 21 are secured by any well-known device (not shown) to the carrying member 20. At strap 25 extending around the torso of the person illustrated has hook members 19 secured thereto. These members are positioned to the opposite ends of the strap 25 and engage with the openings 12 and 14 of the assembly. The hook 43 engages an aperture 49 in the carrier 20 thereby supporting the drums 19 and 21. The hook may be attached to the aperture 47 and detached therefrom by pressing the member 39 and opening the hook for engagement with the aperture 49 and for likewise disengaging the hook therefrom. When a person is carrying an instrument, or instruments, as shown in FIG. 1, the necessity often arises for bending forward or for making rapid movements. The strap 25 which engages the member 11 at both ends thereof and which goes around the back of the person prevents the instruments from swinging forward or away from the person and ending up in an awkward position, or possibly even resulting in the instruments being detached accidentally or dropped from the person carrying the same. From the foregoing, it is apparent that we have provided an improved swivel hook assembly for supporting drums, or other instruments, from the body of an individual carrying the same. The entire assembly is formed of stampings, which are light are relatively inexpensive, which stampings may be formed of the required angles, openings and spring retaining means without the expensive castings which would be required to accomplish the same result.

Various modifications may be made in the form of the invention without departing from the principles disclosed in the foregoing. It is my intention therefore that the accompanying claims be construed as broadly as possible consistant with the prior art.

I claim as my invention:

1. A swivel hook assembly comprising
a substantially flat elongated stamping,
said stamping being provided with a body portion with a vertical elongated slot therein for the reception of a strap adapted to be placed upon the torso of a person,
said stamping including a pair of apertures formed at each end thereof at a position spaced outwardly from said elongated slot,
said stamping also having a flange portion extending from one edge thereof at an angle of approximately 90° from the body portion of the stamping,
an aperture formed centrally of said flange,
a substantially U-shaped stamping adapted to be pivotally connected to said flange,
means for making said pivotal connection including a pivot pin passing through said opening in the flange,
a pair of openings formed at the extremities of said U-shaped stamping,
a hook engaging member including a pair of ears having openings therein,
a second pivot pin extending through the openings in the extremities of said U-shaped member and through the openings in said ears,
a hook member including a second substantially U-shaped member with one end of the second U-shaped member beyond the other end of the second U-shaped member and the former end having an opening formed therein through which said second pivot pin extends,
resilient means for biasing the hook engaging member toward the other end of the hook, and
means for retaining said second pivot pin in said assembly.

2. A swivel hook assembly as claimed in claim 1 wherein the hook engaging member and the hook member are formed of metal stampings.

* * * * *